(12) United States Patent
Arakawa

(10) Patent No.: US 7,573,649 B2
(45) Date of Patent: Aug. 11, 2009

(54) HIGH VARIABLE POWER ZOOM LENS

(75) Inventor: Akio Arakawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 122 days.

(21) Appl. No.: 11/713,103

(22) Filed: Mar. 2, 2007

(65) Prior Publication Data
US 2008/0158689 A1    Jul. 3, 2008

Related U.S. Application Data

(63) Continuation of application No. PCT/JP2005/004464, filed on Mar. 14, 2005.

(30) Foreign Application Priority Data

Sep. 2, 2004    (JP)    ............................. 2004-255791

(51) Int. Cl.
*G02B 15/14*    (2006.01)
(52) U.S. Cl. ...................................... 359/687; 359/683
(58) Field of Classification Search ................. 359/683, 359/687
See application file for complete search history.

(56) References Cited

U.S. PATENT DOCUMENTS

| | | | | |
|---|---|---|---|---|
| 5,235,466 A | * | 8/1993 | Ono et al. ................... | 359/684 |
| 5,396,367 A | * | 3/1995 | Ono et al. ................... | 359/687 |
| 5,557,470 A | * | 9/1996 | Shibayama .................. | 359/687 |
| 6,791,762 B2 | | 9/2004 | Yamada | |
| 7,161,746 B2 | | 1/2007 | Mizuguchi | |
| 7,209,299 B2 | | 4/2007 | Aoki | |

FOREIGN PATENT DOCUMENTS

| | | |
|---|---|---|
| JP | 2003-241097 | 8/2003 |
| JP | 2003-329933 | 11/2003 |
| JP | 2004-069768 | 3/2004 |
| JP | 2004-109559 | 4/2004 |
| JP | 2004-212611 | 7/2004 |

* cited by examiner

*Primary Examiner*—Scott J Sugarman
(74) *Attorney, Agent, or Firm*—Jacobson Holman PLLC

(57) ABSTRACT

The present invention is directed to a high variable power zoom lens that ensures a flange-back or a backfocal distance required for typical 35-mm film cameras while keeping an angle of view sufficient to cover the wide-angle for an APS-size imaging plane dimensioned smaller than 35 mm. The high variable power zoom lens has the first lens group L1 of positive refractivity closest to the subject, the second lens group L2 of negative refractivity second closest to the subject, the third lens group L3 of positive refractivity, and the fourth lens group L4 of positive refractivity farthest from the subject, and the zoom lens satisfies the requirements $0.6 \leq |f2|/fW \leq 0.73$ where f2 is the focal length of the second lens group and fW is the focal length of the entire optics moved to the wide-angle end, and also satisfies the requirements $2.2 \leq f3/fW \leq 3.7$ where f3 is the focal length of the third lens group.

15 Claims, 14 Drawing Sheets

Fno=3.49

−0.300   0.300
SPHERICAL ABERRATION, SINE CONDITION

Y=14.5

−0.020   0.020
CHROMATIC ABERRATION OF MAGNIFICATION

Fno=4.85

−0.300   0.300
SPHERICAL ABERRATION, SINE CONDITION

Y=14.5

−0.020   0.020
CHROMATIC ABERRATION OF MAGNIFICATION

SPHERICAL ABERRATION, SINE CONDITION

CHROMATIC ABERRATION OF MAGNIFICATION

SPHERICAL ABERRATION, SINE CONDITION

CHROMATIC ABERRATION OF MAGNIFICATION

SPHERICAL ABERRATION, SINE CONDITION

CHROMATIC ABERRATION OF MAGNIFICATION

ASTIGMATISM

DISTORTION

SPHERICAL ABERRATION, SINE CONDITION

CHROMATIC ABERRATION OF MAGNIFICATION

HIGH VARIABLE POWER ZOOM LENS

This is a Continuation of PCT/JP2005/004464 filed 14 Mar. 2005 and published in Japanese.

FIELD OF THE INVENTION

The present invention relates to a high variable power zoom lens versatilely functional from the wide-angle to the telephoto of the zooming range, and more particularly, it relates to a high variable power zoom lens that is comprised of four groups of component lenses and is suitable for uses with film of APS size as much as 14.5 mm in image height, electronic still cameras, air-ready broadcasting cameras, and the like.

BACKGROUND OF THE INVENTION

In the prior art, a zoom lens, which is built in single-lens reflex cameras used with 35 mm film for versatile purposes of altering a focal length from the wide-angle to the telephoto, is comprised of four groups of component lenses to attain a high variable power in practical use where the four groups of component lenses include the first lens group of positive refractivity closest to the subject, the second lens group of negative refractivity second closest to the subject, the third lens group of positive refractivity, and the fourth lens group of positive refractivity farthest from the subject.

Such prior art high variable power zoom lens of four-lens-group (+, −, +, and +in refractivity) configuration suitable for use with 35-mm film has been disclosed by way of example as being about 3 to 4 in F number at the wide-angle end, about 6 to 7 in F number in the telephoto end, approximately ×10 in variable power ratio, and reduced in both dimensions and weight (see Patent Document 1 listed below). This high variable power zoom lens has four groups of component lenses which include the first lens group of positive refractivity closest to the subject, the second lens group of negative refractivity second closest to the subject, the third lens group of positive refractivity, and the fourth lens group of positive refractivity farthest behind from the subject, and in varying the power range from the wide-angle end to the telephoto end, the first and second lens groups go apart to leave a greater air gap therebetween, the second and third lens groups come closer to have a reduced air gap therebetween, the third and fourth lens groups come closer to have a reduced air gap therebetween, and the first, third and fourth lens groups move toward the subject although only the second lens group moves in focusing.

Other types of the prior art four-lens-group high variable power zoom lens for 35-mm film are disclosed which are hyper-magnifying power as high as ×12 for the photographing purpose, having additional capabilities of inner-focusing to take a close-up shot and of anti-vibration without compromising its quality performances (see Patent Document 2). The zoom lens is of a type that a sequence of its component lens pieces assume either positive, negative, negative, positive, negative, positive attributes of refractivity or positive, negative, negative, positive, positive attributes of refractivity, and a group of lenses third closest to the subject, namely, the third lens group is dedicated to the focusing while the fifth lens group supports as an anti-vibration means.

Requirements for such great capabilities and quality performances are a power of this anti-vibration lens group in combination with a power of the focusing lens group when the hyper magnification is desired to attain.

Other types of the prior art four-lens-group high variable power zoom lens for 35-mm film are those which serve as an anti-vibration zoom lens of high performance and compact body suitable for photography and videography, having an optical arrangement of the first lens group G1 of positive refractivity closest to the subject, the second lens group G2 of negative refractivity second closest to the subject, the third lens group G3 of positive refractivity, the fourth lens group G4 of negative refractivity, and the fifth lens group G5 of positive refractivity farthest from the subject. In zooming by altering a position relative to the subject from the wide-angle end to the telephoto end in the anti-vibration zoom lens where all adjacent pairs of the lens groups G1, G2, G3, G4 and G5 vary a distance between them, the third lens group G3 consists of a plurality of component lens pieces one of which is a composite lens L3A having a negative lens piece L3AN and a positive lens piece L3AP bonded together, and the composite lens L3A solely moves in a direction almost perpendicular to the optical axis to serve as the anti-vibration lens, which is disclosed as an arrangement for compensating for a blur of a focused image (see Patent Document 3).

Also, in the prior art, disclosed is a fish-eye lens of 10 mm in focal length suitable for digital cameras (see Patent Documents 4 and 5).

Patent Document 1: Japanese Patent Preliminary Publication No. 2003-241097

Patent Document 2: Japanese Patent Preliminary Publication No. 2003-329933

Patent Document 3: Japanese Patent Preliminary Publication No. 2004-212611

Patent Document 4: Japanese Patent Preliminary Publication No. 2004-69768

Patent Document 5: Japanese Patent Preliminary Publication No. 2004-126522

The prior art zoom lens, when used with a single-lens reflex camera suitable for 35-mm film, serves for versatile purposes of altering a focal length from the wide-angle to the telephoto of the zooming range. As newly developed ones of electronic still cameras, or namely, digital still cameras, APS cameras of a smaller imaging plane than a 35-mm film frame have been developed, for example. As for the high variable power zoom lens as disclosed in Patent Document 1, reducing an angle of view while a focal length is unchanged, the resultant angle of view is excessively small for the zoom lens to function as a wide-angle zoom lens. When a curvature, a distance between adjacent lens groups, and other factors are reduced in proportion with one another to have a reduced imaging plane, however, the focal length is decreased at a proportional reduction rate to the imaging screen. As a consequence, a backfocal distance is reduced, and therefore, the zoom lens can no longer be attached to a camera body that has a flange back dimensioned equivalently to that of 35-mm film cameras.

Similarly in the high variable power zoom lenses as disclosed in Patent Documents 2 and 3, reducing the angle of view as small as the APS size while the focal length is retained as it is, the resultant angle of view is too small for the zoom lens to function as a wide-angle zoom lens.

The present invention is made to overcome the above mentioned disadvantages of the prior art high variable power zoom lens of the four-lens-group configuration, and accordingly, it is the subject of the present invention to provide a high variable power zoom lens that ensures a flange-back or a backfocal distance required for typical 35-mm film cameras while keeping an angle of view sufficient to cover the wide-angle for an APS-size imaging plane dimensioned smaller than 35 mm.

SUMMARY OF THE INVENTION

A first invention is a high variable power zoom lens comprised of four groups of component lens pieces, namely, a first lens group L1 of positive refractivity closest to the subject, a second lens group L2 of negative refractivity second closest to the subject, a third lens group L3 of positive refractivity, and a fourth lens group L4 of positive refractivity farthest from the subject, and the zoom lens satisfies requirements expressed in the following formulae:

$$0.6 \leq |f2|/fW \leq 0.73 \quad (1)$$

$$2.2 \leq f3/fW \leq 3.7 \quad (2)$$

where f2 is a focal length of the second lens group, f3 is a focal length of the third lens group, and fW is a focal length of the entire optics in the wide-angle end position.

A second invention is a high variable power zoom lens that has a plurality of lens groups in combination to make total optics where each lens group assumes a predetermined attribute of positive or negative refractivity and is arranged in a predetermined order, and assuming that the second lens group L2 located second closest to the subject is f2 in focal length, the third lens group L3 third closest to the subject is f3 in focal length, and the total optics is fW in focal length when it is in the wide-angle end position, the zoom lens serves as lens optics satisfying the following requirements:

(a) the rate of f2 to fw ranges from about 0.6 to 0.73; and (b) the rate of f3 to fw ranges from about 2.2 to 3.7.

Various aspects of the first and second inventions will be described below.

The lens groups include a fourth lens group L4 fourth closest to the subject, and the fourth lens group L4 includes a component lens piece that has a generally concave major surface faced to the subject and a generally convex major surface faced to the imaging plane.

The lens groups include a fourth lens group L4 fourth closest to the subject, and the fourth lens group L4 includes a composite lens that has a generally convex lens piece and a generally concave lens piece bonded together.

The lens groups include a fourth lens group L4 fourth closest to the subject, and the fourth lens group L4 includes a composite lens that has a convex lens piece and a concave meniscus lens piece bonded together.

The composite lens in the fourth lens group L4 is ahead of the remaining component lens pieces of the same group.

The lens groups include a fourth lens group L4 fourth closest to the subject, and assuming that the fourth lens group L4 in the wide-angle end position exhibits an imaging magnification power designated by β4w while the lens group in the telephoto end position exhibits β4t, at least one of requirements as expressed in the following formulae is satisfied:

$$|\beta 4w| \leq 1.0 \quad (3)$$

$$|\beta 4t| \geq 1.0 \quad (4)$$

The lens groups include a fourth lens group L4 fourth closest to the subject, and assuming that the fourth lens group L4 in the wide-angle end position exhibits an imaging magnification power designated by β4w while the lens group in the telephoto end position exhibits β4t, at least one of requirements expressed in the following formulae is satisfied:

$$|\beta 4w| \approx 1.0 \quad (5)$$

$$|\beta 4t| \approx 1.0 \quad (6)$$

The zoom lens satisfies at least one of requirements expressed in the following formulae:

$$|f2|/fW \approx 0.662 \quad (7)$$

$$|f3|/fW \approx 3.468 \quad (8)$$

where f2 is a focal length of a second lens group, f3 is a focal length of a third lens group, and fW is a focal length of the entire optics in the wide-angle end position.

The zoom lens satisfies at least one of requirements expressed in the following formulae:

$$|f2|/fW \approx 0.674 \quad (9)$$

$$f3/fW \approx 2.432 \quad (10)$$

where f2 is a focal length of a second lens group, f3 is a focal length of a third lens group, and fW is a focal length of the entire optics in the wide-angle end position.

A third invention is a high variable power zoom lens suitable for cameras that are equivalent to an APS size in vertical dimension of its imaging plane and are as long as 35-mm full size camera in flange-back distance, and the zoom lens is comprised of four groups of lenses, namely, first to fourth lens groups arranged in the order on the closest-to-the-subject-first basis, and is capable of zooming for a varied focal length from the wide-angle and to the telephoto of the zooming range. The first lens group L1 consists of a low dispersion convex lens piece having its convex major surface faced to the subject, and a convex meniscus lens piece of the highest refractivity among other component lens in all the lens groups. The second lens group L2 includes at least an aspherical lens piece that has its aspherical convex major surface (r6) faced to the subject and has its refractivity restricted. The third lens group L3 includes at least one of an aspherical lens piece that has a convex major surface (r16) faced to the subject and a low dispersion lens piece. The fourth lens group L4 consists of a composite lens that has a concave lens piece and a convex lens piece bonded together, and an aspherical lens having convex major surface (r31) faced to the subject, the concave lens piece of the composite lens having its concave major surface faced to the subject. The zoom lens provides multi-lens-group optics that is capable of reducing a distortion and an aberration and of adjusting a refractivity to attain a desired magnification power through the arrangement of the first to fourth lens groups in combination, so that a backfocal length can match the APS size to successfully downsize the zoom lens itself.

In general, a high variable power zoom lens of four-lens-group configuration must have an enhanced refractivity of each lens group to reduce a focal length. To have a longer backfocal length, the second lens group must have its refractivity enhanced, or the third or fourth lens group must have its refractivity reduced. In the high variable zoom lens according to the present invention, both of these requirements counterbalance each other so that the refractivity is not enhanced so much in the second lens group while the focal length is shortened, and that the backfocal length or the flange-back distance becomes longer. For that purpose, the component lens pieces are to be refined by selecting their material, quality, and type to meet the conditions (1) and (2) defined in the appended claim 1.

The condition (1) restricts the refractivity of the second lens group. If |f2|/fw exceeds a lower limit of the formula (1), the focal length is reduced, and the backfocal length can be sufficiently longer to permit the zoom lens to be attached to the typical cameras for 35-mm film. Resultantly, however, it becomes hard to correct the distortion aberrations caused in the second lens group. Moreover, despite of the reduced focal length, the first lens group has the component lens pieces increased in lens diameter.

If |f2|/fw exceeds an upper limit of the formula (1), the backfocal length can hardly be ensured.

The condition (2) restricts the refractivity of the third lens group. If f3/fW exceeds a lower limit of the formula (2), the focal length of the fourth lens group is increased, and therefore, it is hard to correct the aberrations caused in the third lens group by back-ups of the fourth lens group. Especially, it is conspicuous that the comatic aberrations worsen. If f3/fW exceeds an upper limit of the formula (2), the focal length of the fourth lens group is reduced unlike the previous case, and hence, it is hard to ensure the backfocal length. Moreover, a curvature of image field is raised, and resultantly, the image field tilts.

It is desirable that the fourth lens group includes more than three lens pieces in line where the second convex lens piece and the third concave piece are bonded together. Since the second lens group is small in focal length, the image field tends to tilt, but the bonding of the second and third lens pieces together permits the Petzval sum to be corrected with ease. The bonded composite lens may be located in the rearmost position in the fourth lens group so as to correct the Petzval sum. With the composite lens in the rearmost position in the fourth lens group, the principal focus considerably shifts deep in the middle of the zoom lens, and in order to avoid this, the composite lens is desired to locate in some fore position in the fourth lens group rather than in the rearmost position.

When the conditions (3) and (4) are simultaneously satisfied, the focal length of the third lens group becomes longer, and the refractivity is reduced.

This enables the peripheral comatic aberrations to be corrected well from the wide-angle end to the middle of the zoom range. Also, a smaller refractivity of the third lens group enables the refractivity of the second lens group to decrease, and thus, the curvature of image field is corrected well. If the conditions (3) and (4) are not simultaneously satisfied, the focal length of the third lens group is reduced, and a displacement of the component lens pieces during the zooming and the entire length of the zoom lens in the telephoto end position are reduced, and in order to ensure the backfocal length of the zoom lens in wide-angle end position, the second lens group must be reduced in focal length, or the second and third lens groups must be farther apart from each other. When the focal length of the second lens group is reduced, it is hard to correct the curvature of image field, and the image field tilts in overfocus. When an interval between the second and third lens groups gets longer, the zoom lens has its entire length lengthened, and this brings about an increase in a filter diameter and a reduction of the peripheral light.

When the conditions (3) and (4) are simultaneously satisfied, a magnification ratio of the fourth lens group is ×1 in the middle of the zoom range. For the four-lens-group zoom lens, the magnification of ×1 of the lens group serving as a correcting lens results in the entire length of the zoom lens decreasing.

In accordance with the present invention, a high variable power zoom lens effectively ensures a flange-back or a backfocal distance required for typical 35-mm film cameras while keeping an angle of view sufficient to cover a wide-angle for an APS-size imaging plane dimensioned smaller than 35 mm.

BEST MODE OF THE INVENTION

Preferred embodiments of the present invention will now be described.

EMBODIMENT 1

Various factors of a first preferred embodiment of a high variable power zoom lens according to the present invention will be provided. NS in the first column, R in the second column, D in the third, Nd in the fourth, and ν in the fifth respectively denote numbers of surfaces of the component lens in the order from the closest to the subject to the farthest therefrom, radii of curvature of the component lens pieces, intervals from one of the adjacent lens piece surfaces to the other, refractivities in terms of d-line (λ=587.6 nm), and Abbe numbers of the component lens pieces. STOP designates an aperture stop.

Focal Length f=18.5~50.3~194.0
F Number Fno=3.49~4.85~6.35
Conditional Equation (1) |f2|/fW=0.662
Conditional Equation (2) f3/fW=3.468
The surfaces denoted by NS=r6, r16, and r31 are an aspherical surface of which surface geometry can be expressed in the following formula:

$$x = \frac{H^2/R}{1 + \sqrt{1-(EP \times H^2/R^2)}} + A \times H^4 + B \times H^6 + C \times H^8 + D \times H^{10} \quad (11)$$

Surface Number NS(r), Radius of Curvature R, Surface Interval D, Refractivity Nd and Abbe Number ν

| NS | R | D | Nd | ν |
|---|---|---|---|---|
| r1 | 102.0000 | 1.5 | 1.84666 | 23.78 |
| r2 | 57.3039 | 7 | 1.497 | 81.61 |
| r3 | −1637.2725 | 0.2 | | |
| r4 | 57.3980 | 5 | 1.7725 | 49.6 |
| r5 | 206.1032 | D (5) | | |
| r6 | 120.0000 | 0.2 | 1.5146 | 49.96 |
| r7 | 72.0000 | 1.2 | 1.883 | 40.78 |
| r8 | 14.2700 | 5 | | |
| r9 | −58.5441 | 1 | 1.804 | 46.58 |
| r10 | 33.8586 | 0.8 | | |
| r11 | 30.9343 | 4.5 | 1.84666 | 23.78 |
| r12 | −23.8690 | 0.55 | | |
| r13 | −18.7953 | 0.9 | 1.83481 | 42.72 |
| r14 | −104.1144 | D (14) | | |
| r15 | STOP | 0.9 | | |
| r16 | 40.2000 | 0.2 | 1.5146 | 49.96 |
| r17 | 40.2000 | 3.6 | 1.48749 | 70.21 |
| r18 | −40.2000 | 0.2 | | |
| r19 | 25.7051 | 3.8 | 1.497 | 81.61 |
| r20 | 150.0000 | 1.7 | | |

-continued

| NS | R | D | Nd | ν |
|---|---|---|---|---|
| r21 | −21.8899 | 1 | 1.834 | 37.17 |
| r22 | −109.7447 | D (22) | | |
| r23 | 24.8862 | 5.5 | 1.51633 | 64.15 |
| r24 | −26.1016 | 0.2 | | |
| r25 | 289.9935 | 4 | 1.48749 | 70.21 |
| r26 | −16.4651 | 1 | 1.804 | 46.58 |
| r27 | −63.0556 | 0.4167 | | |
| r28 | 154.3072 | 1 | 1.804 | 46.58 |
| r29 | 31.3635 | 1.6414 | | |
| r30 | 48.8300 | 0.2 | 1.5146 | 49.96 |
| r31 | 75.0000 | 4 | 1.48749 | 70.21 |
| r32 | −230.0000 | | | |

Coefficient of Aspherical Surface

| R (r) | EP | A | B | C | D |
|---|---|---|---|---|---|
| r6 | 1 | 1.71156E−05 | −4.42209E−08 | 2.17233E−10 | 7.38429E−14 |
| r16 | 1 | 1.19086E−05 | 2.09858E−08 | 1.23071E−11 | 1.03042E−13 |
| r31 | 1 | −4.00000E−05 | −5.55462E−08 | −4.97082E−10 | 1.44868E−12 |

Interval Variations

| D | f = 18.5 | f = 50.3 | f = 194.0 |
|---|---|---|---|
| D (5) | 1.674 | 22.9426 | 47.3034 |
| D (14) | 21.4522 | 10.6385 | 0.9536 |
| D (22) | 8.3768 | 4.4818 | 2.3768 |

Figure 1:
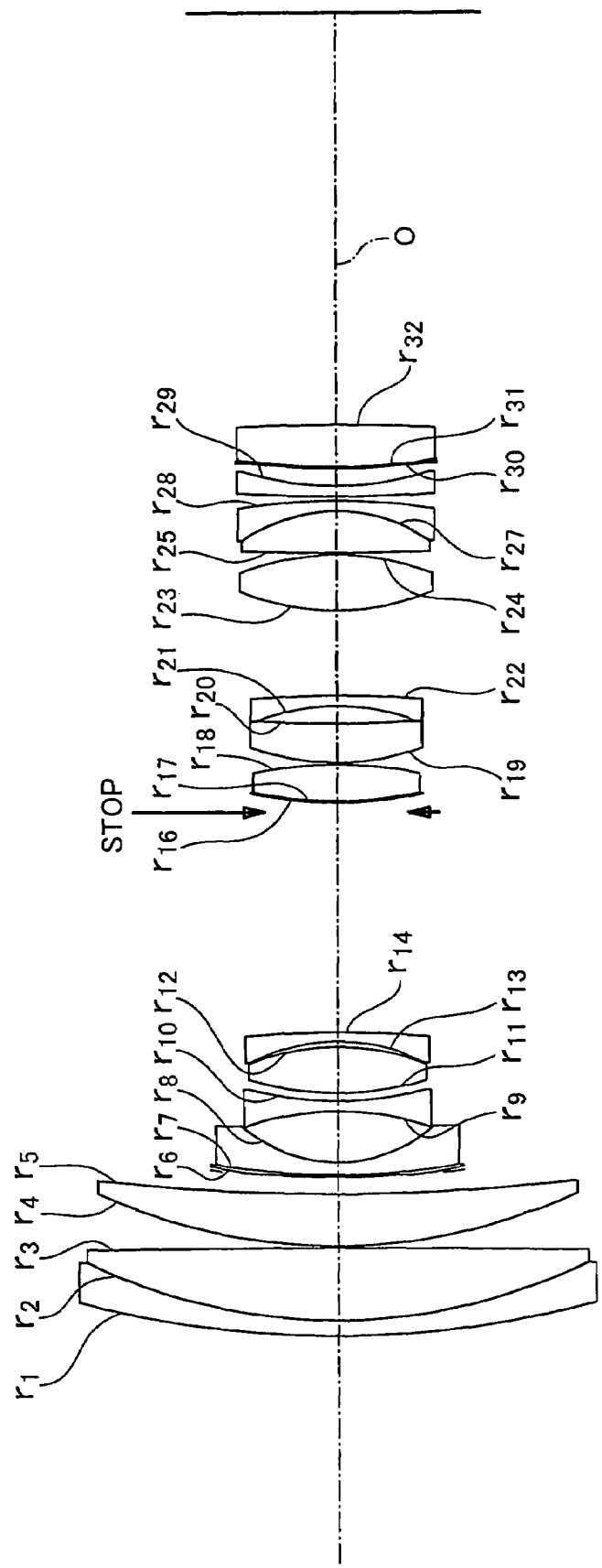
FIG. 1 is a sectional view illustrating optics of a first preferred embodiment of a high variable power zoom lens according to the present invention.
Figure 2:
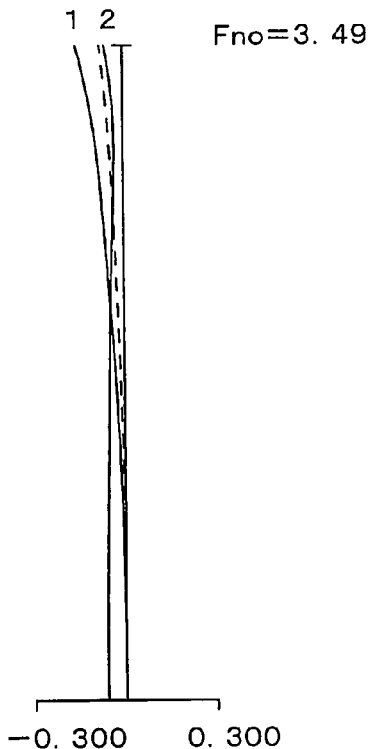
FIG. 2 depicts spherical aberration and sine conditions of the first embodiment of the high variable power zoom lens that is focalized on the point of infinity and moved to the wide-angle end.
Figure 3:
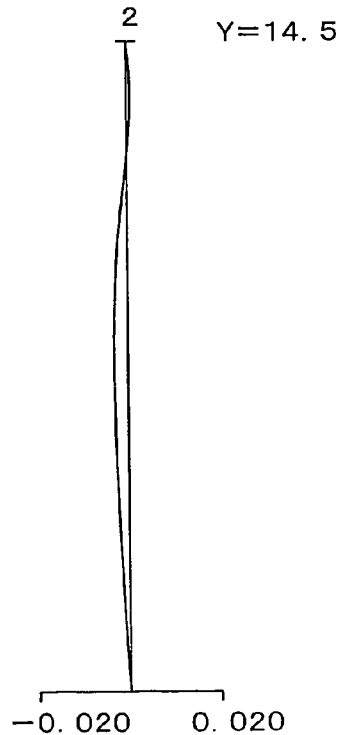
FIG. 3 depicts chromatic aberration of magnification of the first embodiment of the high variable power zoom lens that is focalized on the point of infinity and moved to the wide-angle end.
Figure 4:
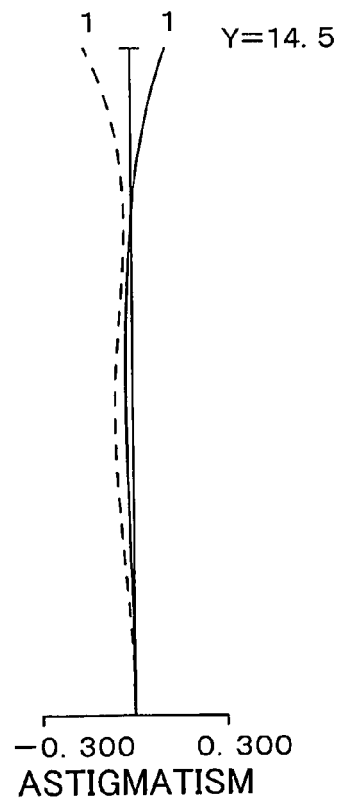
FIG. 4 depicts astigmatism of the first embodiment of the high variable power zoom lens that is focalized on the point of infinity and moved to the wide-angle end.
Figure 5:
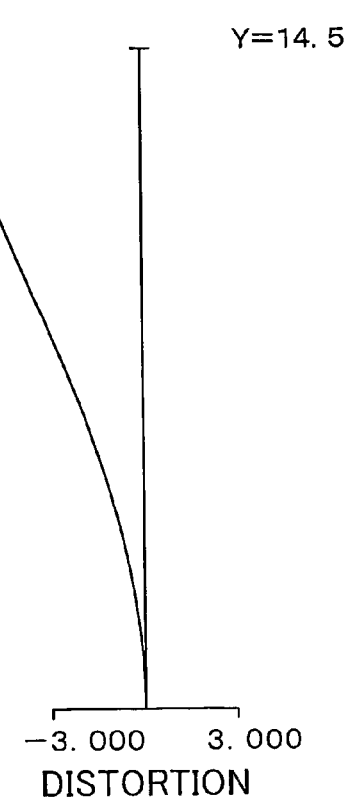
FIG. 5 depicts distortion aberration of the first embodiment of the high variable power zoom lens that is focalized on the point of infinity and moved to the wide-angle end.
Figure 7:
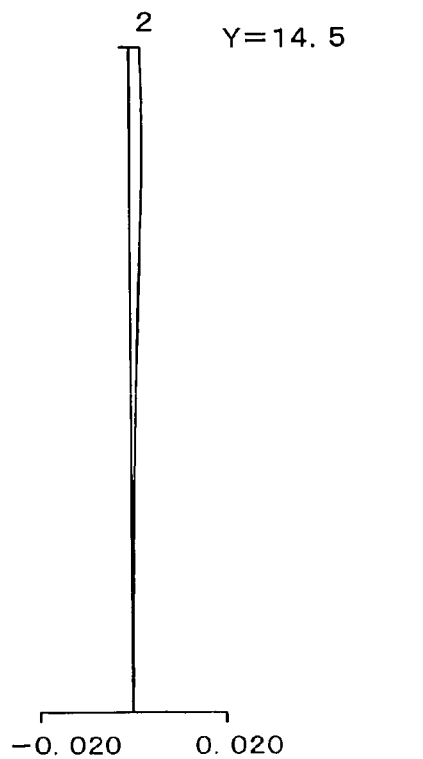
FIG. 7 depicts chromatic aberration of magnification of the first embodiment of the high variable power zoom lens that is focalized on the point of infinity and moved to the middle of the zoom range.
Figure 8:
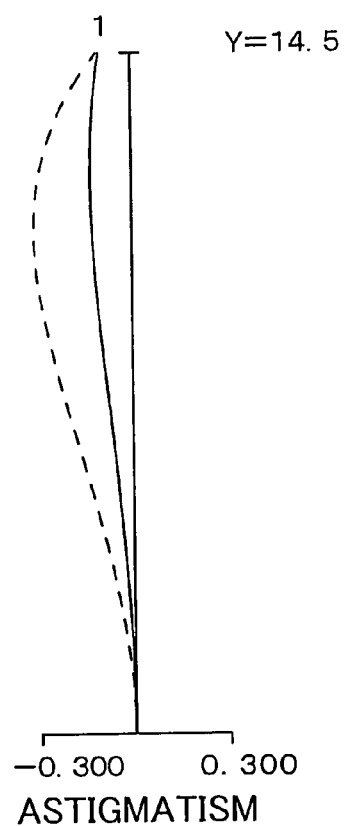
FIG. 8 depicts astigmatism of the first embodiment of the high variable power zoom lens that is focalized on the point of infinity and moved to the middle of the zoom range.
Figure 9:
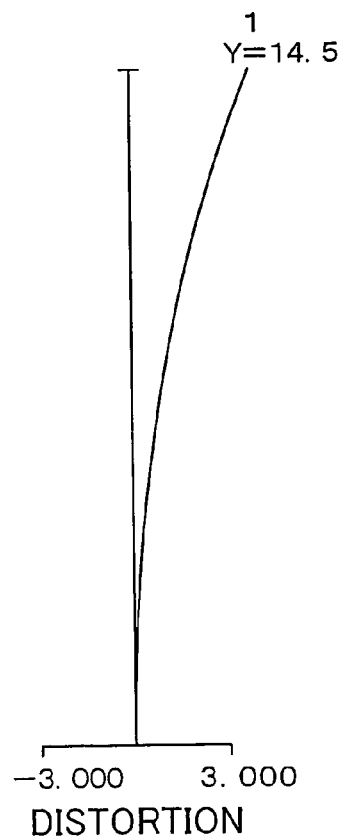
FIG. 9 depicts distortion aberration of the first embodiment of the high variable power zoom lens that is focalized on the point of infinity and moved to the middle of the zoom range.
Figure 10:
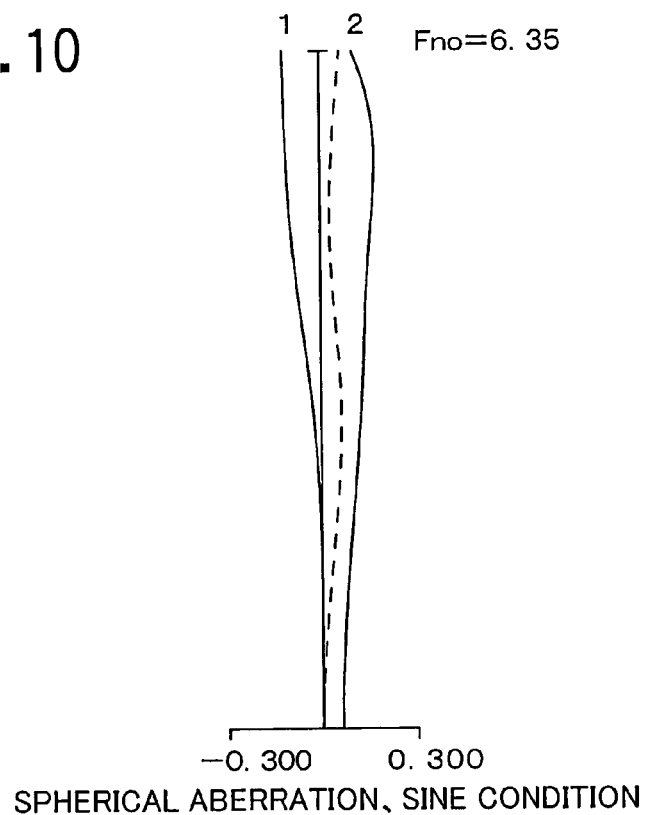
FIG. 10 depicts spherical aberration and sine conditions of the first embodiment of the high variable power zoom lens that is focalized on the point of infinity and moved to the telephoto end.
Figure 11:
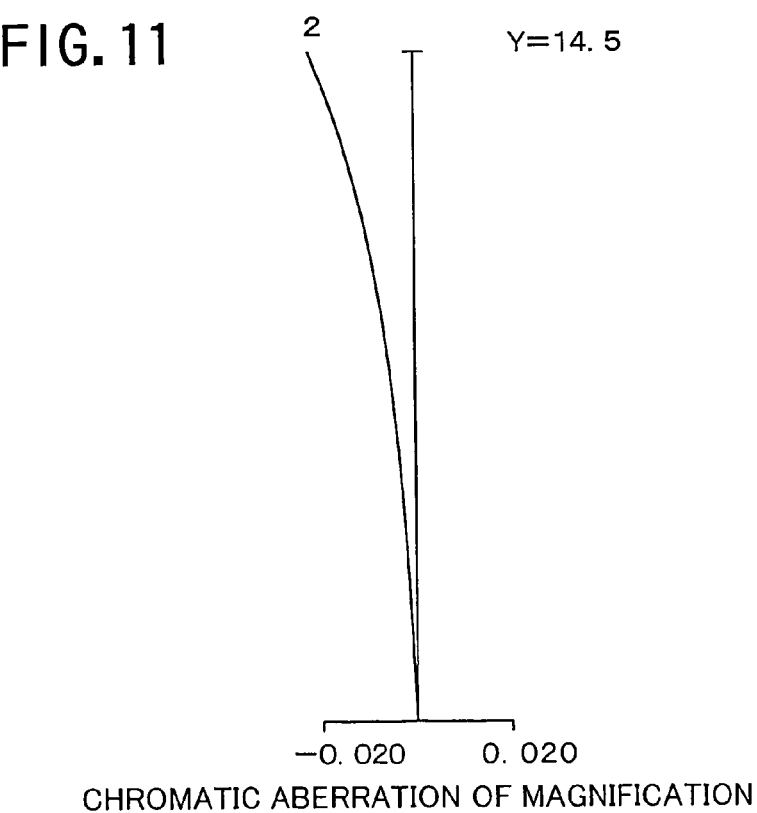
FIG. 11 depicts chromatic aberration of magnification of the first embodiment of the high variable power zoom lens that is focalized on the point of infinity and moved to the telephoto end.
Figure 12:
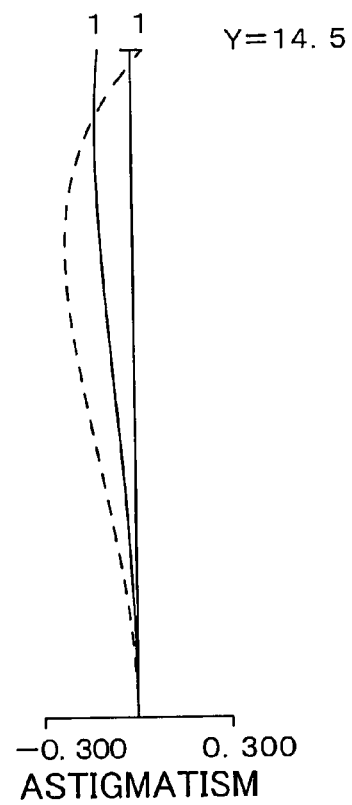
FIG. 12 depicts astigmatism of the first embodiment of the high variable power zoom lens that is focalized on the point of infinity and moved to the telephoto end.
Figure 13:
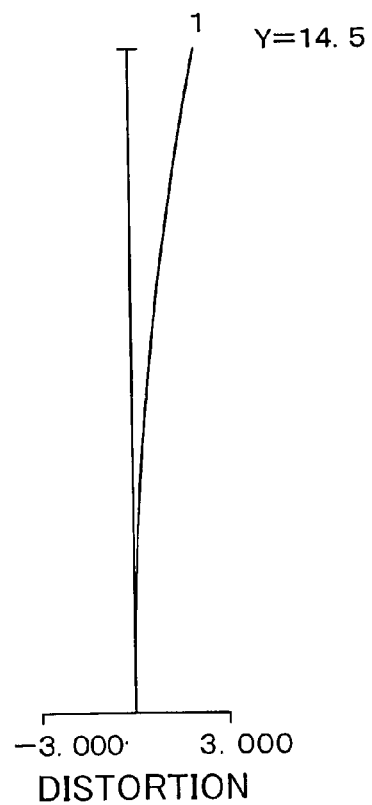
FIG. 13 depicts distortion aberration of the first embodiment of the high variable power zoom lens that is focalized on the point of infinity and moved to the telephoto end.

Optics of a first preferred embodiment of the high variable power zoom lens according to the present invention is illustrated in a sectional view of FIG. 1. FIG. 2 shows spherical aberration and sine conditions of the high variable power zoom lens that is focalized on the point of infinity and moved to the wide-angle end. FIG. 3 shows chromatic aberration of magnification of the zoom lens in the wide-angle end position. FIG. 4 depicts astigmatism of the zoom lens in the wide-angle end position. FIG. 5 illustrates distortion aberration of the zoom lens in the wide-angle end position. FIG. 7 shows chromatic aberration of magnification of the zoom lens that is moved to the middle of the zooming range. FIG. 8 depicts astigmatism of the zoom lens in the middle of the zooming range. FIG. 9 illustrates distortion aberration of the zoom lens in the middle of the zooming range. FIG. 10 illustrates spherical aberration and sine conditions of the zoom lens that is focalized to the point of infinity and moved to the telephoto end. FIG. 11 shows chromatic aberration of magnification of the zoom lens in the telephoto end position. FIG. 12 depicts astigmatism of the zoom lens in the telephoto end position. FIG. 13 shows distortion aberration of the zoom lens in the telephoto end position.

Figure 6:
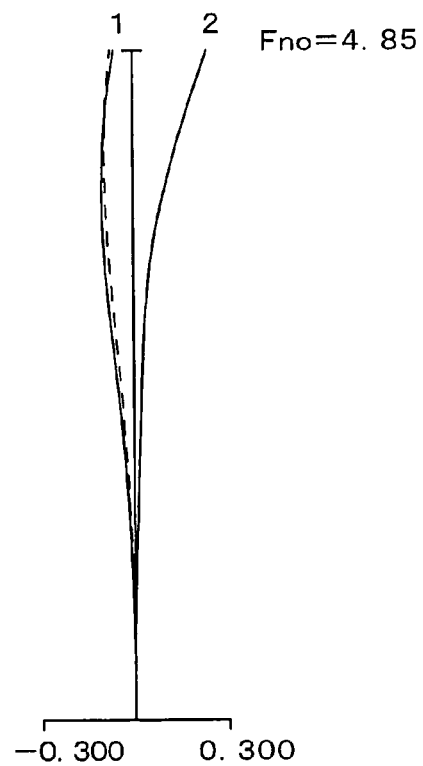
FIG. 6 depicts spherical aberration and sine conditions of the first embodiment of the high variable power zoom lens that is focalized on the point of infinity and moved to the middle of the zoom range.

In FIGS. 2, 6 and 10, alphaneumeric symbols Fno, 1, and 2 designate F numbers, d-line (λ=587.56 nm), and g-line (λ=435.83 nm), respectively. Broken line depicts the sine conditions.

Referring to FIGS. 3, 7, and 11, alphaneumeric symbols Y and 2 denote a vertical imaging dimension, and the chromatic aberration of the g-line relative to the d-line, respectively.

In FIGS. 4, 8, and 12, alphaneumeric symbols Y and 1 respectively denote a vertical imaging dimension, and the astigmatism of the d-line. Solid line depicts the astigmatism in the sagittal direction while broken line shows the astigmatism in the meridian direction.

In FIGS. 5, 9, and 13, alphaneumeric symbols Y and 1 designate a vertical imaging dimensions, and the distortion aberration of the d-line, respectively.

EMBODIMENT 2

Various factors of a second preferred embodiment of the high variable power zoom lens will be provided below. Since reference numerals and symbols are similar to those of the first preferred embodiment, descriptions of what are designated by the like symbols are omitted.

Focal Length f=18.5~50.3~194.0
F Number Fno=3.62~5.03~6.35
Conditional Equation (1) |f2|/fW=0.674
Conditional Equation (2) f3/fW=2.432

The surfaces denoted by NS=r6, r16, and r31 are an aspherical surface of which surface geometry is similar to that expressed in the equation (11).

Surface Number NS(r), Radius of Curvature R, Surface Interval D, Refractivity Nd, and Abbe Number ν

| NS | R | D | Nd | ν |
|---|---|---|---|---|
| r1 | 115.6820 | 1.5 | 1.84666 | 23.78 |
| r2 | 62.4605 | 7.5 | 1.497 | 81.61 |
| r3 | −532.3234 | 0.2 | | |
| r4 | 57.4173 | 4.6 | 1.7725 | 49.6 |
| r5 | 189.5960 | D (5) | | |
| r6 | 125.0000 | 0.2 | 1.5146 | 49.96 |
| r7 | 70.0000 | 1.2 | 1.883 | 40.78 |
| r8 | 14.0000 | 5.2 | | |
| r9 | −28.9926 | 1 | 1.804 | 46.58 |
| r10 | 36.1741 | 0.8 | | |
| r11 | 31.9554 | 4.6 | 1.84666 | 23.78 |
| r12 | −25.7238 | 0.3785 | | |
| r13 | −20.2555 | 1 | 1.83481 | 42.72 |
| r14 | −99.6449 | D (14) | | |
| r15 | STOP | 0.9 | | |
| r16 | 32.4468 | 0.2 | 1.5146 | 49.96 |
| r17 | 32.4468 | 4 | 1.48749 | 70.21 |
| r18 | −65.8700 | 0.2 | | |
| r19 | 23.0159 | 3.6604 | 1.497 | 81.61 |
| r20 | 243.4030 | 1.3256 | | |
| r21 | −31.4792 | 1 | 1.834 | 37.17 |
| r22 | −283.0519 | D (22) | | |
| r23 | 20.0273 | 5 | 1.48749 | 70.21 |
| r24 | −27.1833 | 0.2 | | |
| r25 | −72.2206 | 3.5 | 1.48749 | 70.21 |
| r26 | −17.7337 | 1 | 1.7725 | 49.6 |
| r27 | 61.9241 | 1.5848 | | |
| r28 | −38.2812 | 1 | 1.804 | 46.58 |
| r29 | −142.8859 | 0.4337 | | |
| r30 | 51.8443 | 0.2 | 1.5146 | 49.96 |
| r31 | 51.8443 | 4 | 1.48749 | 70.21 |
| r32 | −27.1700 | | | |

Coefficient of Aspherical Surface

| R (r) | EP | A | B | C | D |
|---|---|---|---|---|---|
| r6 | 1 | 1.48582E−05 | −5.85665E−08 | 3.19778E−10 | −4.92100E−13 |
| r16 | 1 | 9.93860E−06 | 1.82794E−08 | 1.29583E−10 | −2.10778E−12 |
| r31 | 1 | −7.45086E−05 | −8.12400E−09 | −3.67850E−10 | 1.63789E−12 |

Internal Variations

| D | f = 18.5 | f = 50.3 | f = 194.0 |
|---|---|---|---|
| D (5) | 1.866 | 21.9534 | 48.3144 |
| D (14) | 23.583 | 10.8587 | 0.719 |
| D (22) | 6.8383 | 2.867 | 1.0652 |

Figure 14:
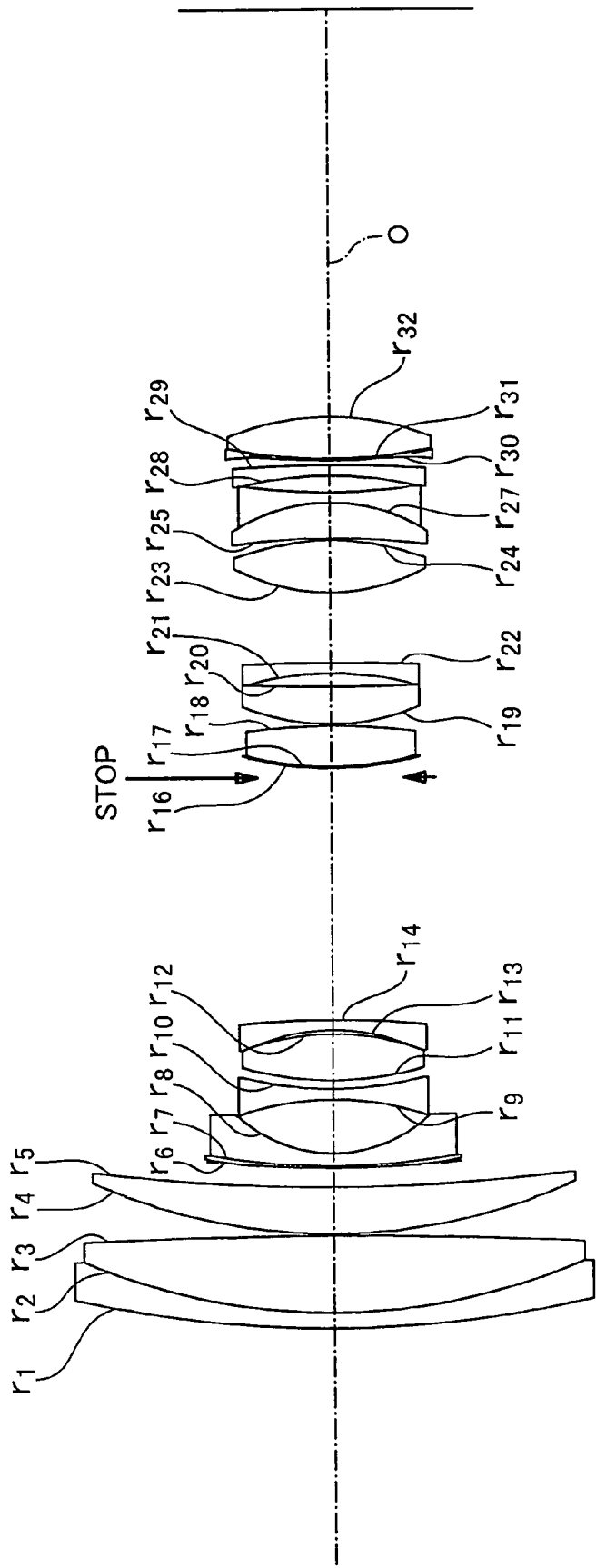
FIG. 14 is a sectional view illustrating optics of a second preferred embodiment of a high variable power zoom lens according to the present invention.
Figure 15:
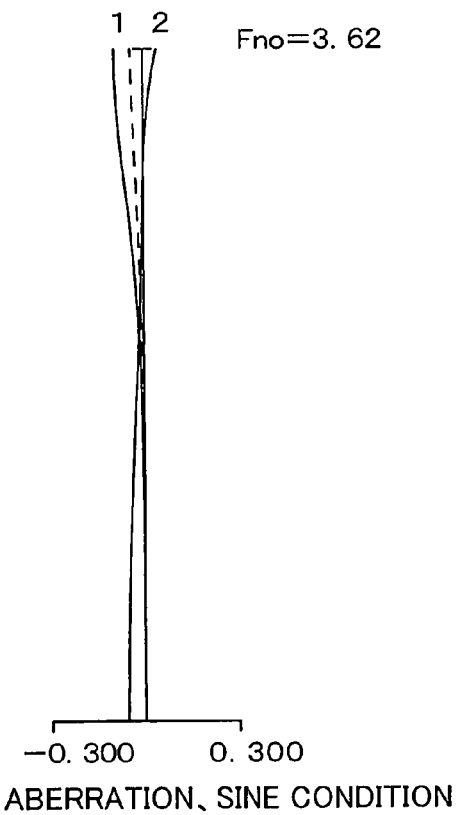
FIG. 15 depicts spherical aberration and sine conditions of the second embodiment of the high variable power zoom lens that is focalized on the point of infinity and moved to the wide-angle end.
Figure 16:
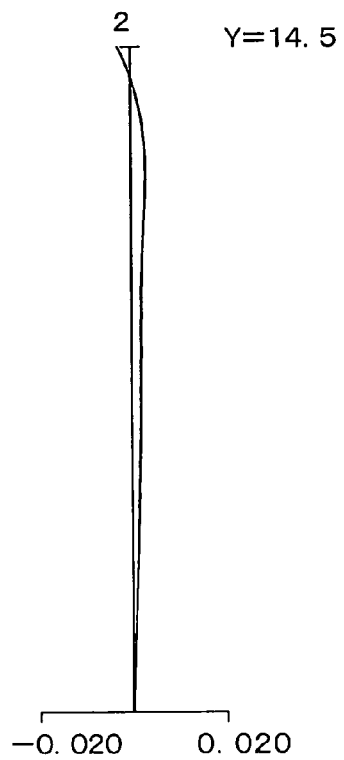
FIG. 16 depicts chromatic aberration of magnification of the second embodiment of the high variable power zoom lens that is focalized on the point of infinity and moved to the wide-angle end.
Figure 17:
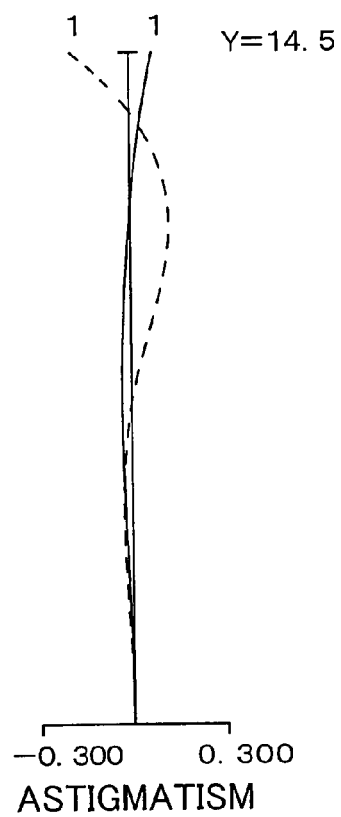
FIG. 17 depicts astigmatism of the second embodiment of the high variable power zoom lens that is focalized on the point of infinity and moved to the wide-angle end.
Figure 18:
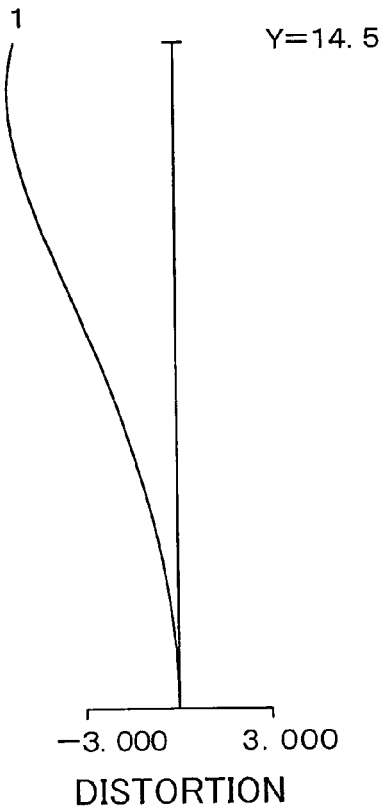
FIG. 18 depicts distortion aberration of the second embodiment of the high variable power zoom lens that is focalized on the point of infinity and moved to the wide-angle end.
Figure 19:
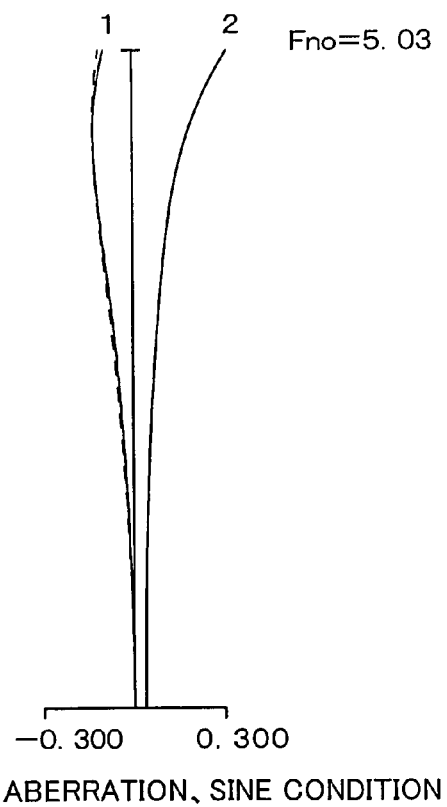
FIG. 19 depicts spherical aberration and sine conditions of the second embodiment of the high variable power zoom lens that is focalized on the point of infinity and moved to the middle of the zoom range.
Figure 20:
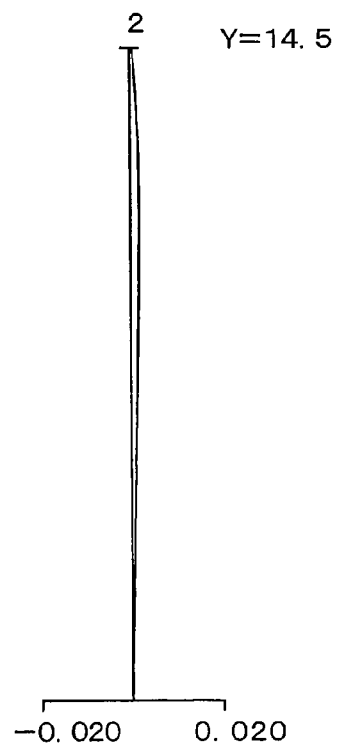
FIG. 20 depicts chromatic aberration of magnification of the second embodiment of the high variable power zoom lens that is focalized on the point of infinity and moved to the middle of the zoom range.
Figure 21:
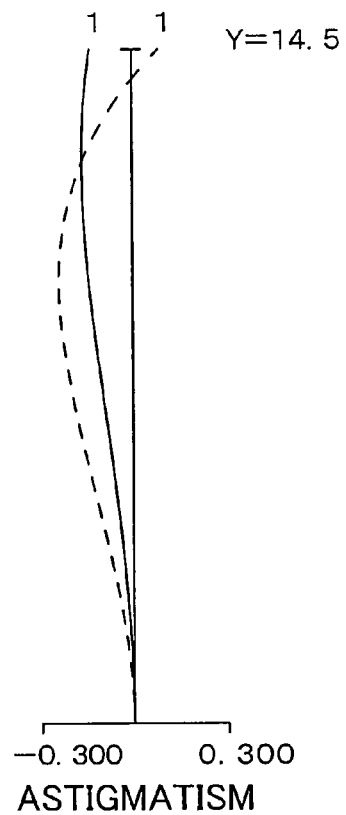
FIG. 21 depicts astigmatism of the second embodiment of the high variable power zoom lens that is focalized on the point of infinity and moved to the middle of the zoom range.
Figure 22:
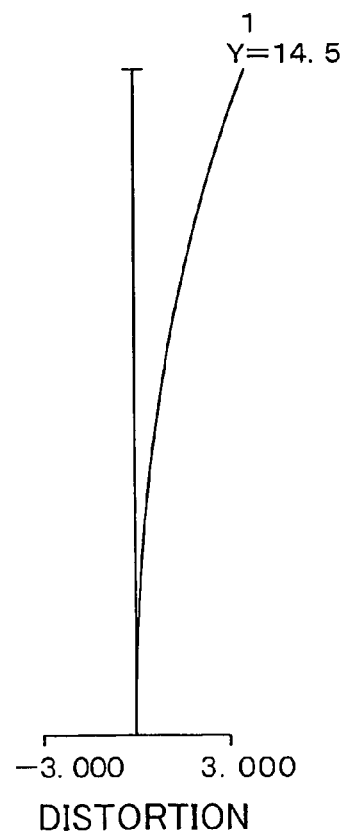
FIG. 22 depicts distortion aberration of the second embodiment of the high variable power zoom lens that is focalized on the point of infinity and moved to the middle of the zoom range.
Figure 23:
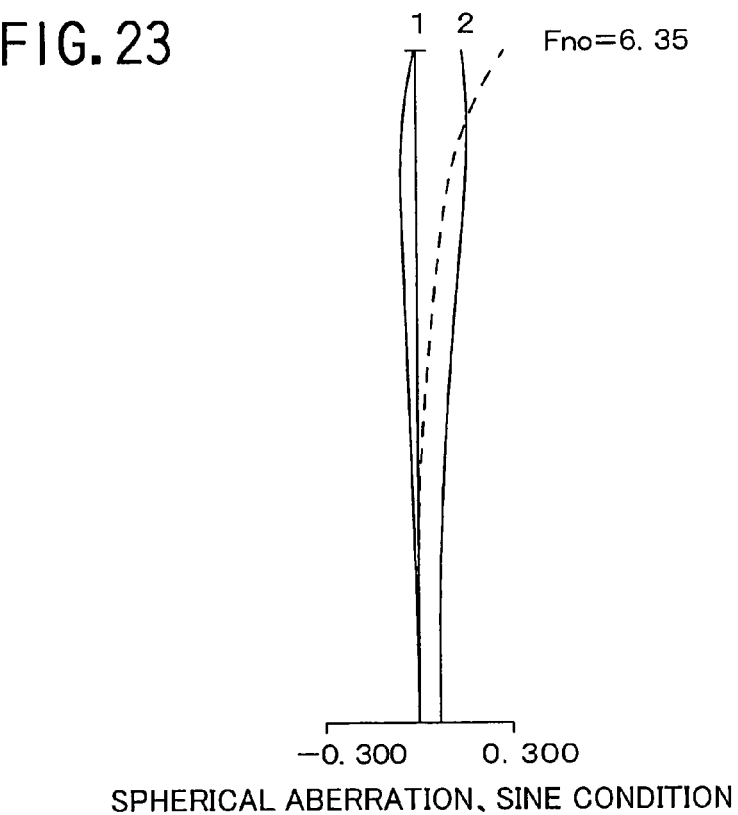
FIG. 23 depicts spherical aberration and sine conditions of the second embodiment of the high variable power zoom lens that is focalized on the point of infinity and moved to the telephoto end.
Figure 24:
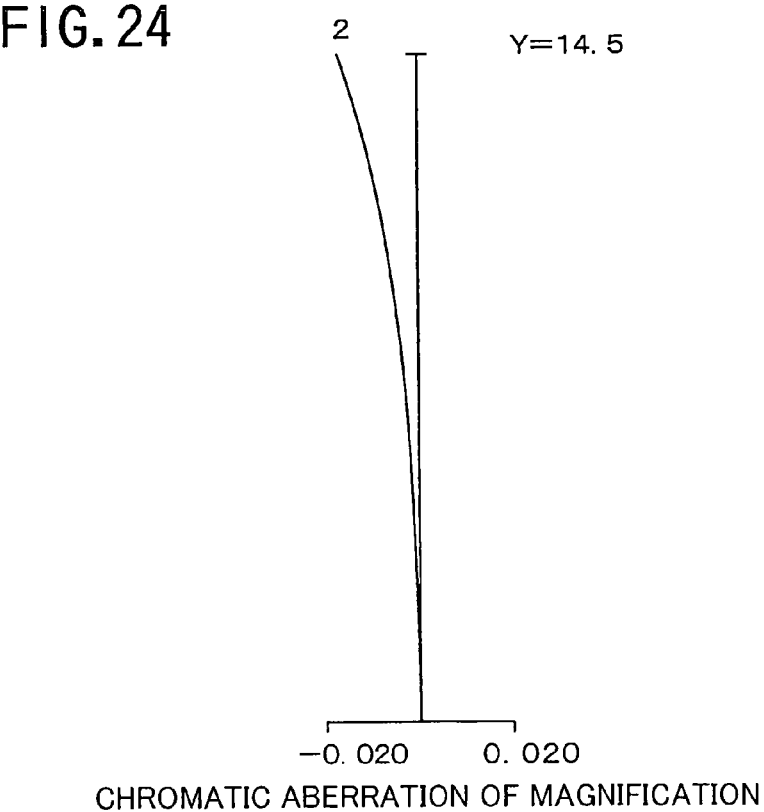
FIG. 24 depicts chromatic aberration of magnification of the second embodiment of the high variable power zoom lens that is focalized on the point of infinity and moved to the telephoto end.
Figure 25:
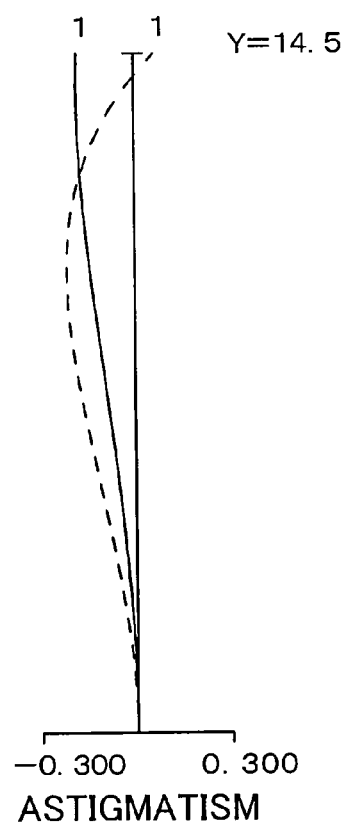
FIG. 25 depicts astigmatism of the second embodiment of the high variable power zoom lens that is focalized on the point of infinity and moved to the telephoto end.
Figure 26:
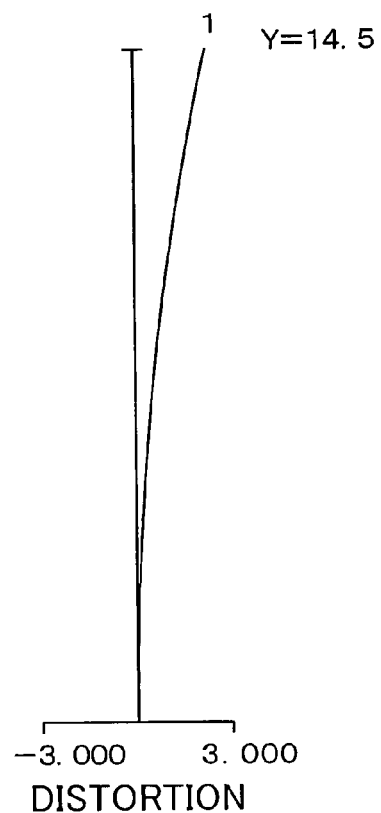
FIG. 26 depicts distortion aberration of the second embodiment of the high variable power zoom lens that is focalized on the point of infinity and moved to the telephoto end.

Optics of a first preferred embodiment of the high variable power zoom lens according to the present invention is illustrated in a sectional view of FIG. 14. FIG. 15 shows spherical aberration and sine conditions of the high variable power zoom lens that is focalized on the point of infinity and moved to the wide-angle end. FIG. 16 shows chromatic aberration of magnification of the zoom lens in the wide-angle end position. FIG. 17 depicts astigmatism of the zoom lens in the wide-angle end position. FIG. 18 illustrates distortion aberration of the zoom lens in the wide-angle end position. FIG. 19 shows spherical aberration and sine conditions of the zoom lens that is moved to the middle of the zooming range. FIG. 20 shows chromatic aberration of magnification of the zoom lens in the middle of the zooming range. FIG. 21 depicts astigmatism of the zoom lens in the middle of the zooming range. FIG. 22 shows distortion aberration of the zoom lens in the middle of the zooming range. FIG. 23 illustrates spherical aberration and sine conditions of the second preferred embodiment of the zoom lens that is focalized to the point of infinity and moved to the telephoto end. FIG. 24 shows chromatic aberration of magnification of the zoom lens in the telephoto end position. FIG. 25 depicts astigmatism of the zoom lens in the telephoto end position. FIG. 26 shows distortion aberration of the zoom lens in the telephoto end position.

In FIGS. 15, 19, and 23, alphaneumeric symbols Fno, 1, and 2 designate F numbers, d-line ($\lambda$=587.56 nm), and g-line ($\lambda$=435.83 nm), respectively. Broken line depicts the sine conditions.

Referring to FIGS. 16, 20, and 24, alphaneumeric symbols Y and 2 denote a vertical imaging dimension, and the chromatic aberration of the g-line relative to the d-line, respectively.

In FIGS. 17, 21, and 25, alphaneumeric symbols Y and 1 respectively denote a vertical imaging dimension and the astigmatism of the d-line. Solid line depicts the astigmatism in the sagittal direction while broken line depicts the astigmatism in the meridian direction.

In FIGS. 18, 22, and 26, alphaneumeric symbols Y and 1 designate a vertical imaging dimension, and the astigmatism of the d-line, respectively.

As to the fourth lens group illustrated in FIGS. 1 and 14, requirements as expressed in the following formulae are provided:

$$|\beta 4w| \leq 1.0$$

$$|\beta 4t| \geq 1.0$$

where β4w is an imaging magnification power exhibited by the fourth lens group L4 in the wide-angle end position exhibits, and β4t is that exhibited by the lens group in the telephoto end position, and based on the above formulae, effects as discussed below will be attained: First, assuming now that the zoom lens is moved to the wide-angle end and requirements given by |β4w|≦1.0 are satisfied, the third lens group is increased in focal length and reduced in refractivity. In this way, the peripheral comatic aberrations can be corrected well from the wide-angle to the middle of the zooming zone.

In addition, under the opposite conditions contradicting |β4w|≦1.0, the zoom lens, when moved to the wide-angle position, is prone to underperform the required correction of the spherical aberrations, but this can be improved.

As a result of what has been discussed above, the first embodiment of the lens configuration depicted in FIG. 1 could attain the optimum performance of correcting the comatic aberrations and spherical aberrations by meeting the requirements as follows:

$$|4w|=0.480, \text{ and } |\beta 4|=1.811$$

Although the applications of the lens configurations in FIGS. 1 and 14 have been described, the zoom lens of the present invention should not be limited to such precise manners, but can be varied in any way (material, quality, type, etc.), if the zoom lens has any optics that is configured under the requirements of $0.6 \leq |f2|/fW \leq 0.73$ and $2.2 \leq f3/fW \leq 3.7$ where f2 is a focal length of a second lens group, f3 is a focal length of a third lens group, and fW is a focal length of the entire optics of the zoom lens in the wide-angle end position, or under the requirements that the rate of f2 to fW ranges from approximately 0.6 to 0.73, and the rate of f3 to fW ranges from approximately 2.2 to 3.7.

What is claimed is:

1. A high variable power zoom lens comprising four groups of component lens pieces, namely, a first lens group L1 of positive refractivity closest to the subject, a second lens group L2 of negative refractivity second closest to the subject, a third lens group L3 of positive refractivity, and a fourth lens group L4 of positive refractivity farthest from the subject, wherein the fourth lens group L4 is fourth closest to the subject, and the fourth lens group L4 includes a composite lens that has a convex lens piece and a concave meniscus lens piece bonded together, wherein the concave meniscus lens piece has a concave surface facing the subject, and the zoom lens satisfying requirements expressed in the following formula:

$$0.6 \leq |f2|/fW \leq 0.73 \quad (1)$$

$$2.2 \leq f3/fW \leq 3.7 \quad (2)$$

where f2 is a focal length of the second lens group, f3 is a focal length of the third lens group, and fW is a focal length of the entire optics in the wide-angle end position.

2. A high variable power zoom lens as defined in claim 1, wherein the fourth lens group L4 includes a component lens piece that has a generally concave major surface facing the subject and a generally convex major surface facing the imaging plane.

3. A high variable power zoom lens as defined in claim 1, wherein said composite lens in the fourth lens group L4 is ahead of the remaining component lens pieces of the fourth lens group L4.

4. A high variable power zoom lens as defined in claim 1, wherein the fourth lens group L4 in the wide-angle end position exhibits an imaging magnification power designated by β4w while the lens group in the telephoto end position exhibits an imaging magnification power designated by β4t, and at least one of requirements as expressed in the following formula is satisfied:

$$|\beta 4w| \leq 1.0, \text{ and } |\beta 4t| \geq 1.0.$$

5. A high variable power zoom lens as defined in claim 1, wherein the fourth lens group L4 in the wide-angle end position exhibits an imaging magnification power designated by β4w while the lens group in the telephoto end position exhibits an imaging magnification power designated by β4t, and at least one of requirements expressed in the following formula is satisfied:

$$|\beta 4w| \cong 1.0, \text{ and } |\beta 4t| \cong 1.0.$$

6. A high variable power zoom lens as defined in claim 1, wherein said zoom lens satisfies at least one of requirements expressed in the following formula:

$$|f2|/fW \cong 0.662, \text{ and } f3/fW \cong 3.468$$

where f2 is a focal length of a second lens group, f3 is a focal length of a third lens group, and fW is a focal length of the entire optics in the wide-angle end position.

7. A high variable power zoom lens as defined in claim 1, wherein said zoom lens satisfies at least one of requirements expressed in the following formula:

$$|f2|/fW \cong 0.674, \text{ and } f3/fW \cong 2.432$$

where f2 is a focal length of a second lens group, f3 is a focal length of a third lens group, and fW is a focal length of the entire optics in the wide-angle end position.

8. A high variable power zoom lens comprising a plurality of lens groups in combination to make total optics wherein:
   each lens group assumes a predetermined attribute of positive or negative refractivity and is arranged in a predetermined order, and the plurality of lens groups includes:
   a second lens group L2 located second closest to the subject, where the second lens group L2 is f2 in focal length,
   a third lens group L3 third closest to the subject; where the third lens group L3 is f3 in focal length,
   a fourth lens group L4 fourth closest to the subject, where the fourth lens group L4 includes a composite lens that has a convex lens piece and a concave meniscus lens piece bonded together, wherein the concave meniscus lens piece has a concave surface facing the subject, and the total optics moved to the wide-angle end is fW in focal length, the zoom lens serves as lens optics satisfying the following requirements:
   the rate of f2 to fW ranges from about 0.6 to 0.73; and
   the rate of f3 to fW ranges from about 2.2 to 3.7.

9. A high variable power zoom lens as defined in claim 8, wherein the fourth lens group L4 includes a component lens piece that has a generally concave major surface facing the subject and a generally convex major surface facing the imaging plane.

10. A high variable power zoom lens as defined in claim 8, wherein said composite lens in the fourth lens group L4 is ahead of the remaining component lens pieces of the fourth lens group L4.

11. A high variable power zoom lens as defined in claim 8, wherein said lens groups include a fourth lens group L4 fourth closest to the subject, and assuming that the fourth lens group L4 in the wide-angle end position exhibits an imaging magnification power designated by β4w while the lens group in the telephoto end position exhibits an imaging magnification power designated by β4t, at least one of requirements as expressed in the following formula is satisfied:

$$|\beta 4w| \leq 1.0, \text{ and } |\beta 4t| \geq 1.0.$$

12. A high variable power zoom lens as defined in claim 8, wherein said lens groups include a fourth lens group L4 fourth closest to the subject, and assuming that the fourth lens group L4 in the wide-angle end position exhibits an imaging magnification power designated by β4w while the lens group in the telephoto end position exhibits an imaging magnification power designated by β4t, at least one of requirements expressed in the following formula is satisfied:

$|β4w| \cong 1.0$, and $|β4t| \cong 1.0$.

13. A high variable power zoom lens as defined in claim 8, wherein said zoom lens satisfies at least one of requirements expressed in the following formula:

$|f2|/fW \cong 0.662$, and $f3/fW \cong 3.468$ where f2 is a focal length of a second lens group, f3 is a focal length of a third lens group, and fW is a focal length of the entire optics in the wide-angle end position.

14. A high variable power zoom lens as defined in claim 8, wherein said zoom lens satisfies at least one of requirements expressed in the following formula:

$|f2|/fW \cong 0.674$, and $f3/fW \cong 2.432$ where f2 is a focal length of a second lens group, f3 is a focal length of a third lens group, and fW is a focal length of the entire optics in the wide-angle end position.

15. In a high variable power zoom lens suitable for cameras that are equivalent to an APS size in vertical dimension of its imaging plane and are as long as 35-mm full size camera in flange-back distance, the zoom lens being comprised of four groups of lenses, namely, first to fourth lens groups arranged in the order on the closest-to-the-subject-first basis, and being capable of zooming for a varied focal length from the wide-angle and to the telephoto of the zooming range, the first lens group L1 consists of a low dispersion convex lens piece having its convex major surface faced to the subject, and a convex meniscus lens piece of positive refractivity of the highest refractivity among other component lens in all the lens groups, the second lens group L2 includes at least an aspherical lens piece that has its aspherical convex major surface (r6) faced to the subject, the third lens group L3 includes at least one of an aspherical lens piece that has a convex major surface (r16) faced to the subject and a low dispersion lens piece, the fourth lens group L4 consists of a mating lens or a composite lens that has a concave lens piece and a convex lens piece bonded together, and an aspherical lens having convex major surface (r31) faced to the subject, the concave lens piece of the composite lens having its concave major surface faced to the subject.

\* \* \* \* \*